US009823333B2

(12) United States Patent
Cox et al.

(10) Patent No.: US 9,823,333 B2
(45) Date of Patent: Nov. 21, 2017

(54) POWER AND NETWORK INDEPENDENT LOCATING OF A LOST DEVICE

(71) Applicant: International Business Machines Corporation, Armonk, NY (US)

(72) Inventors: Benjamin D. Cox, Winchester (GB); Daniel P. Craggs, Montreal (CA); Christopher J. Poole, Hampshire (GB); Lakshmi Deepak Yalamanchili, Ajax (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 33 days.

(21) Appl. No.: 14/883,703

(22) Filed: Oct. 15, 2015

(65) Prior Publication Data

US 2017/0108574 A1 Apr. 20, 2017

(51) Int. Cl.
  *G01S 5/02* (2010.01)
  *H04B 17/27* (2015.01)
  *H04W 4/00* (2009.01)
  *H04W 8/00* (2009.01)
  *H04B 17/318* (2015.01)

(52) U.S. Cl.
  CPC ............. *G01S 5/0231* (2013.01); *G01S 5/02* (2013.01); *G01S 5/0236* (2013.01); *H04B 17/27* (2015.01); *H04B 17/318* (2015.01); *H04W 4/00* (2013.01); *H04W 8/005* (2013.01)

(58) Field of Classification Search
  None
  See application file for complete search history.

(56) References Cited

U.S. PATENT DOCUMENTS

| 2006/0193299 | A1* | 8/2006 | Winget | H04L 63/0492 370/338 |
| 2013/0076523 | A1* | 3/2013 | Kwan | A61B 5/0022 340/686.6 |
| 2014/0135042 | A1 | 5/2014 | Buchheim et al. | |
| 2014/0191868 | A1 | 7/2014 | Ortiz et al. | |
| 2015/0005002 | A1* | 1/2015 | Boulay | G01S 5/0072 455/456.1 |

OTHER PUBLICATIONS

Apendix P, Sep. 15, 2016.
Apendix P, Mar. 13, 2017.

* cited by examiner

*Primary Examiner* — Charles Appiah
*Assistant Examiner* — Margaret G Mastrodonato
(74) *Attorney, Agent, or Firm* — Garg Law Firm, PLLC; Rakesh Garg; Isaac Gooshaw

(57) ABSTRACT

A broadcast from a beacon associated with a mobile device is detected, at a proximate device. The broadcast includes an identifier associated with the mobile device. The identifier is sent to a service provider system to receive a confirmation that the mobile device associated with the identifier is lost. Upon receiving the confirmation, using the proximate device, a first location of the proximate device is determined at a first time, and a first signal strength of the broadcast is measured at the first time and at the first location. A location of the beacon is computed using the first signal strength and the first location from the proximate device, and by further using a second signal strength measurement at a second location and a third signal strength at a third location.

18 Claims, 7 Drawing Sheets

POWER AND NETWORK INDEPENDENT LOCATING OF A LOST DEVICE

TECHNICAL FIELD

The present invention relates generally to a method, system, and computer program product for locating a lost mobile device. More particularly, the present invention relates to a method, system, and computer program product for power and network independent locating of a lost device.

BACKGROUND

Users presently carry a variety of mobile devices with them. Some examples of mobile devices include mobile phones, tablet computers, and notebook or laptop data processing systems. Some mobile devices are wearable on the person of the user. Some examples of the wearable type of mobile devices take the form of smart watches, interactive eyewear, devices embedded in clothing or footwear, controllers wearable as rings, and pedometers.

SUMMARY

An embodiment detects, at a proximate device, a broadcast from a beacon associated with a mobile device, the broadcast comprising an identifier associated with the mobile device. The embodiment sends the identifier to a service provider system. The embodiment receives, from the service provider system, a confirmation that the mobile device associated with the identifier is lost. The embodiment determines, at the proximate device, responsive to the receiving, a first location of the proximate device at a first time. The embodiment measures, using a processor and a memory at the proximate device, a first signal strength of the broadcast at the first time and at the first location. The embodiment computes a location of the beacon using the first signal strength and the first location from the proximate device, and by further using a second signal strength measurement at a second location and a third signal strength at a third location.

Another embodiment includes a computer program product for these operations, the computer program product comprising one or more computer-readable storage devices, and program instructions stored on at least one of the one or more storage devices.

Another embodiment includes a computer system for performing these operations, the computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
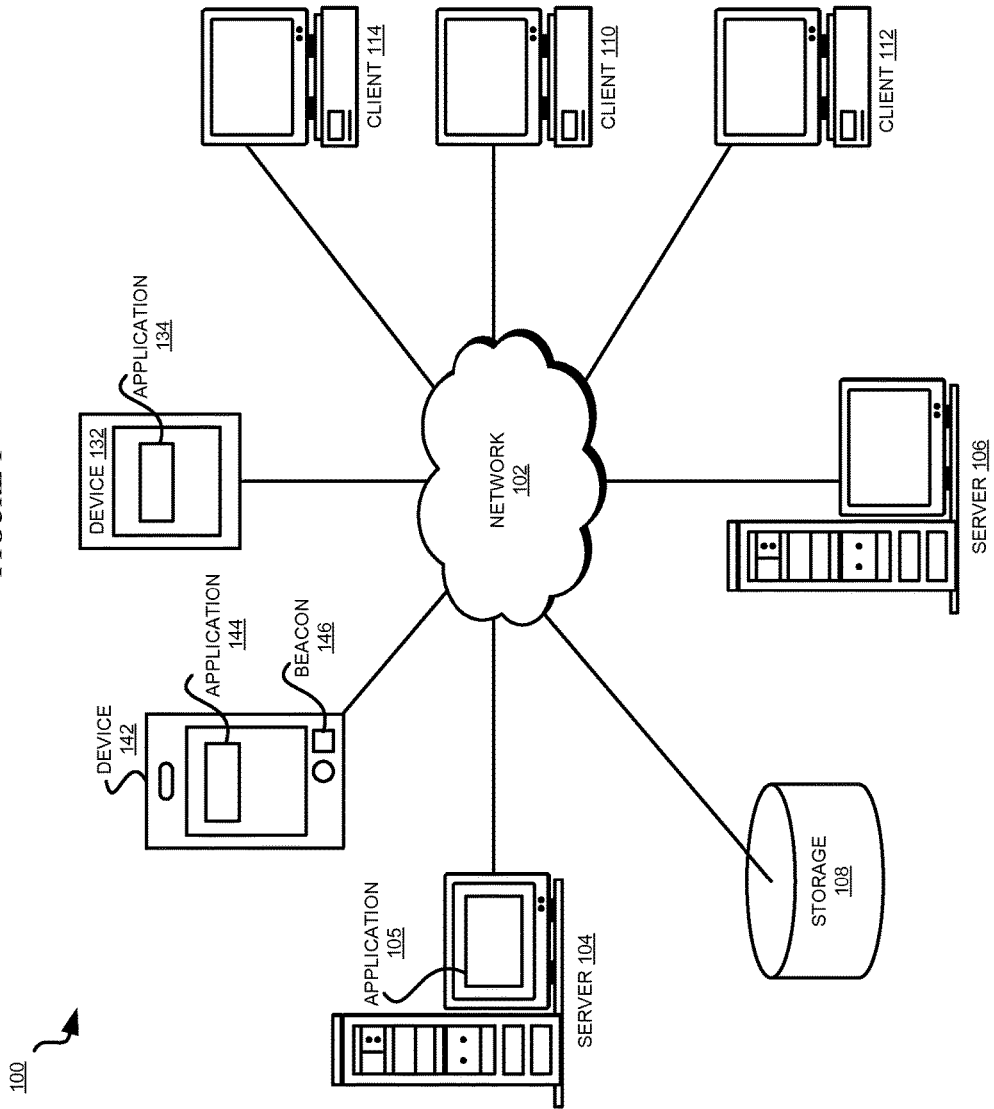
FIG. 1 depicts a block diagram of a network of data processing systems in which illustrative embodiments may be implemented.

Like other things carried and lost by people, people frequently lose mobile devices as well. Some methods for finding a lost mobile device are presently available. For example, one presently available method sends a message or command to a lost device over a data network. If the device is communicating over the data network, the message causes the lost mobile device to transmit its own location over the data network, configures the device to operate in a restricted manner, or some combination thereof.

Another presently available method requires that the mobile device post its own location periodically to a server regardless of whether the device is lost. When the device is lost, the continued posting of the location helps locate the lost device.

The illustrative embodiments recognize that the presently available methods for locating a lost mobile device suffer from certain drawbacks. For example, the presently available methods require the lost device to have remaining power in the device's main battery, require the device to be able to communicate over a data network, or both.

The illustrative embodiments recognize that neither of these conditions can be assumed when a mobile device is lost. For example, when a lost device has remained powered on for a period after being lost, the charge of the battery of the device depletes and the device loses power as a result. Once the device power is lost, the device cannot communicate over any network, receive any commands, or perform any operations. When the device is truly lost, e.g., has fallen from the user's pocket under a park bench, the lack of power makes the device impossible to locate electronically, save a manual search by the user.

When a device is stolen, the malicious user is often cut off the device from all network communication, such as by putting the device in "airplane" mode, until they have reconfigured the device. The reconfigured device need not necessarily respond to the commands when the device reestablishes network communications.

In some cases, the device may be lost in a location where no data communication networks are available. Or, the device may eventually lose power at the location and all network communications cease. Thus, the illustrative embodiments recognize that requiring the device's power, communication abilities, or both, to remain available when the device is lost makes for an unreliable method for locating the lost device.

The illustrative embodiments used to describe the invention generally address and solve the above-described problems and other problems related to locating a lost mobile device. The illustrative embodiments provide a method, system, and computer program product for power and network independent locating of a lost device.

The illustrative embodiments recognize that low-power long range beacons are presently available. These beacons are electronic devices of very small form-factor, such as the size of a dime, which are self-contained with their own power source. When activated, such a beacon periodically broadcasts a small amount of data using a configured protocol. The broadcast can be received by other devices that are configured to receive such transmissions over that protocol.

The illustrative embodiments also recognize that some beacons can take the form of a radio frequency (RF) powered device, such as a Radio Frequency Identification (RFID) tag affixed to an vehicle passing through a toll-booth. When exposed to RF energy, such a device converts the RF energy into electrical power, and uses the electrical power to broadcast a small amount of data stored in the device's memory. Within the scope of the illustrative embodiments, a beacon can take the form of a self-contained powered device or a passive RF-powered device.

The illustrative embodiments described herein apply to mobile devices that include a beacon. Furthermore, within the scope of the illustrative embodiments, a beacon in a mobile device does not depend on the mobile device's battery as a power source, and does not depend on the mobile device's access to a data network to perform the broadcasts. The beacon of a lost device operates either on a self-contained power source built within the beacon, or by harnessing RF energy as described earlier.

Within the scope of the illustrative embodiments, a beacon is coupled with a mobile device in a substantially permanent manner, such that the beacon is not readily decoupled from the mobile device without some destruction of the mobile device, the beacon, or both. For example, within the scope of one embodiment, a beacon is configured in or with a mobile device in such a manner that the beacon cannot be disassociated from the mobile device without significantly disassembling the mobile device. For example, the beacon cannot be removed from the mobile device without opening the mobile device's case, accessing the mobile device's circuit board, and cutting a circuit in the mobile device's circuit board.

An embodiment is implemented in a mobile device that is lost. Hereinafter, a lost mobile device is referred to as a "lost device".

Another embodiment is implemented in another device that receives a broadcast of the beacon of the lost device. Such a device may be, but need not necessarily be, a mobile device. For example, a fixed receiver at a location may be able to pick-up a broadcast from the beacon of the lost device. Such other mobile and/or fixed devices are collectively referred to herein as a "proximate device(s)".

Another embodiment is implemented in a system of a data communication service provider. This service provider provides a data communication service to a proximate device. The service provider may be, but need not be, a service provider to the lost device as well. An operation of an embodiment does not depend upon the service provider providing a data communication service to the lost device.

One embodiment, which is implemented as an application in a lost device, activates the beacon in the lost device in response to detecting that the power availability at the device has depleted below a threshold level. Such an embodiment is useful when a presently available method for locating the device is also in use. The presently available method can operate to locate the lost device while the lost device has power, and the embodiment takes over in continuing the electronic locatability of the lost device in response to the lost device losing power or is about to lose power.

Another embodiment, which is implemented as an application in a lost device, activates the beacon in the lost device regardless of power availability at the lost device. Such an embodiment is useful when a presently available method for locating the lost device is either not available on the lost device, not configured on the lost device, disabled on the lost device, or cannot be relied upon for other reasons.

Another embodiment, which is implemented as an application in a proximate device, detects a broadcast from a beacon in a lost device. For example, suppose that the beacon of a lost device wirelessly broadcasts with sufficient power to reach proximate devices within fifty meters of the lost device. The beacon broadcasts an identifier associated with the lost device. The embodiment at a proximate device that is located close by, e.g., at a distance of five meters from the lost device, wirelessly detects a strong signal from the beacon, e.g., where the signal strength exceeds a threshold. The embodiment at a proximate device that is located far away, e.g., at a distance of forty five meters from the lost device, detects a weak signal from the beacon, e.g., where the signal strength is below the threshold.

Operating in this manner, the embodiment at the proximate device measures a signal strength of the beacon of the lost device and receives the identifier of the lost device. In one non-limiting example, the identifier is a Universally Unique IDentifier (UUID) associated with the lost device by a data processing system of a service provider of the lost device. Generally, the identifier broadcast from the beacon of a lost device is any suitable identifier using which a service provider, not limited to the lost device's service provider, that can identify the lost device and a user of the lost device.

The embodiment at the proximate device determines the proximate device's location. For example, the embodiment determines the proximate device's location by obtaining the Global Positioning System (GPS) coordinates from a GPS module in the proximate device. As another example, the embodiment determines the proximate device's location by trilateration, triangulation, or multi-angulation, using the Wi-Fi access points detected at or available to the proximate device. As another example, embodiment determines the proximate device's location by trilateration, triangulation, or multi-angulation, using the cellular base stations detected at or available to the proximate device.

The embodiment at the proximate device sends the identifier to the proximate device's service provider system to determine whether the mobile device associated with the identifier is a lost device. Different embodiments at the proximate device operate differently when the mobile device associated with the identifier is a lost device.

If the mobile device associated with the identifier is a lost device, one example embodiment executing at the proximate device sends the signal strength measurement and the proximate device's location to the proximate device's service provider system. As the proximate device moves relative to the lost device, such an embodiment may send to the proximate device's service provider system, one or more measurements of the signal strength together with one or more corresponding locations of the proximate device. Each or some of these communications from the proximate device to the service provider's system can include the identifier broadcast by the beacon.

If the mobile device associated with the identifier is a lost device, another example embodiment executing at the proximate device saves the signal strength measurement and the proximate device's location at time T1. As the proximate device moves relative to the lost device, such an embodiment makes another measurement of the signal strength together with a corresponding location of the proximate device at time T2. In this manner, the example embodiment makes three or more measurements and location determinations.

By trilateration, triangulation, or multi-angulation, on the three or more signal strength measurements and the corresponding locations of the proximate device, the example embodiment executing at the proximate device computes a location of the lost device. The example embodiment sends the computed location of the lost device to the proximate device's service provider system. This communication from the proximate device to the service provider's system can also include the identifier broadcast by the beacon.

Another embodiment executes at a system of the proximate device's service provider. This embodiment at the service provider's system receives the communications from the embodiment at the proximate device. In one case, as described above, an embodiment at the proximate device sends one or more measurements of the signal strength of the beacon, one or more corresponding locations of the proximate device when those signal strengths were measured, and optionally the identifier transmitted by the beacon. In such a case, the embodiment at the service provider's system collects such one or more communications from one or more proximate devices that are able to receive the lost device's beacon broadcast. The embodiment at the service provider's system performs trilateration, triangulation, or multi-angulation, on three or more signal strength measurements and the corresponding locations of the one or more proximate devices, and computes a location of the lost device.

In another case, as described above an embodiment at the proximate device computes the location of the lost device and sends that computed location to the service provider's system. In such a case, the embodiment at the service provider's system receives the computed location of the lost device.

In either case, in response to the embodiment at the service provider's system having the location of the lost device, the embodiment identifies a user associated with the lost device. For example, one embodiment determines that the identified lost device is serviced by the service provider of the proximate device, and therefore, the service provider's system has the information of the user of the lost device. The embodiment selects the information of the user and notifies the user about the location of the lost device.

Another embodiment determines that the identified lost device is serviced by a service provider other than the service provider of the proximate device. Therefore, the embodiment at the service provider's system passes location of the lost device and the identifier of the lost device to the other service provider's system through a back-channel communication between service providers. The other service provider's system notifies the user about the location of the user's lost device.

A method of an embodiment described herein, when implemented to execute on a device or data processing system, comprises substantial advancement of the functionality of that device or data processing system in locating a lost device. For example, a known method of locating a lost mobile device relies upon the availability of power, data communication capabilities, or both, while the device remains lost in order to locate the lost device. An embodiment uses a low-power beacon with a separate power source to broadcast an identifier of the device when the device is lost. The low-power mode is so configured at the beacon that the separate power source can last for many days, weeks, months, or even longer. In some cases the beacon can operate whenever the beacon is exposed to RF energy. The transmission of the beacon is not reliant upon the power source of the lost device, or the communication capabilities of the lost device. Such a manner of power and network independent locating of a lost device is unavailable in presently available devices or data processing systems. Thus, a substantial advancement of such devices or data processing systems by executing a method of an embodiment is in making a lost device locatable even when the power and the communication capabilities of the lost device are unusable at the lost device.

The illustrative embodiments are described with respect to certain beacons, protocols, methods of transmissions, identifiers, location information, signal strength measurements, thresholds, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
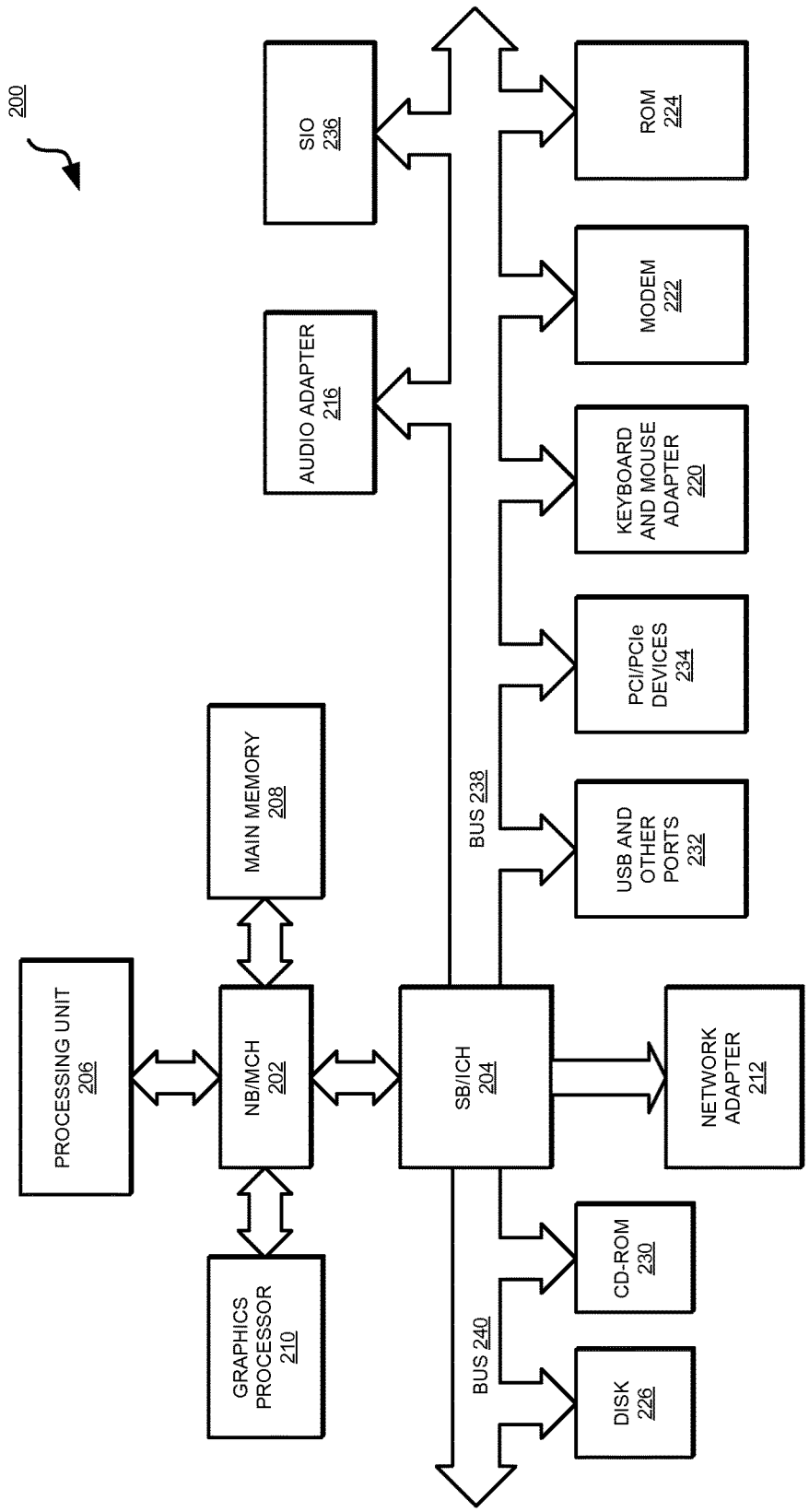
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a mobile device described herein. For example, device 132 can take the form of a smartphone, a tablet computer, a laptop computer, client 110 in a portable form, a wearable computing device, or any other suitable mobile device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Device 142 is another mobile device similar to device 132. Assume that device 142 is a lost device. Application 144 in device 142 implements a lost device embodiment described herein and uses beacon 146 of device 142. Device 132 can be a proximate device. Application 134 in device 132 implements a proximate device embodiment described herein. Device 132 may also include a beacon (not shown) in the manner of beacon 146. As an example, device 132 and device 142 may each be capable of functioning as a lost device under some circumstances and as a proximate device in other circumstances. Thus, in such implementations, each of devices 132 and 142 includes a beacon similar to beacon 146; and each of devices 132 and 142 includes application 134 and 144, respectively, which implement both—lost device embodiments as well as proximate device embodiments. Server 104 is an example of a service provider's system. Application 105 in server 104 implements one or more of those embodiments that are described herein as operating in a service provider's system.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 or 142 in FIG. 1 in which computer usable program code or instructions implementing the processes of the illustrative embodiments may be located. Data processing system 200 is described as a computer only as an example, without being limited thereto. Implementations in the form of other devices, such as device 132 or 142 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as applications 105, 134, and 144 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations.

Figure 3:
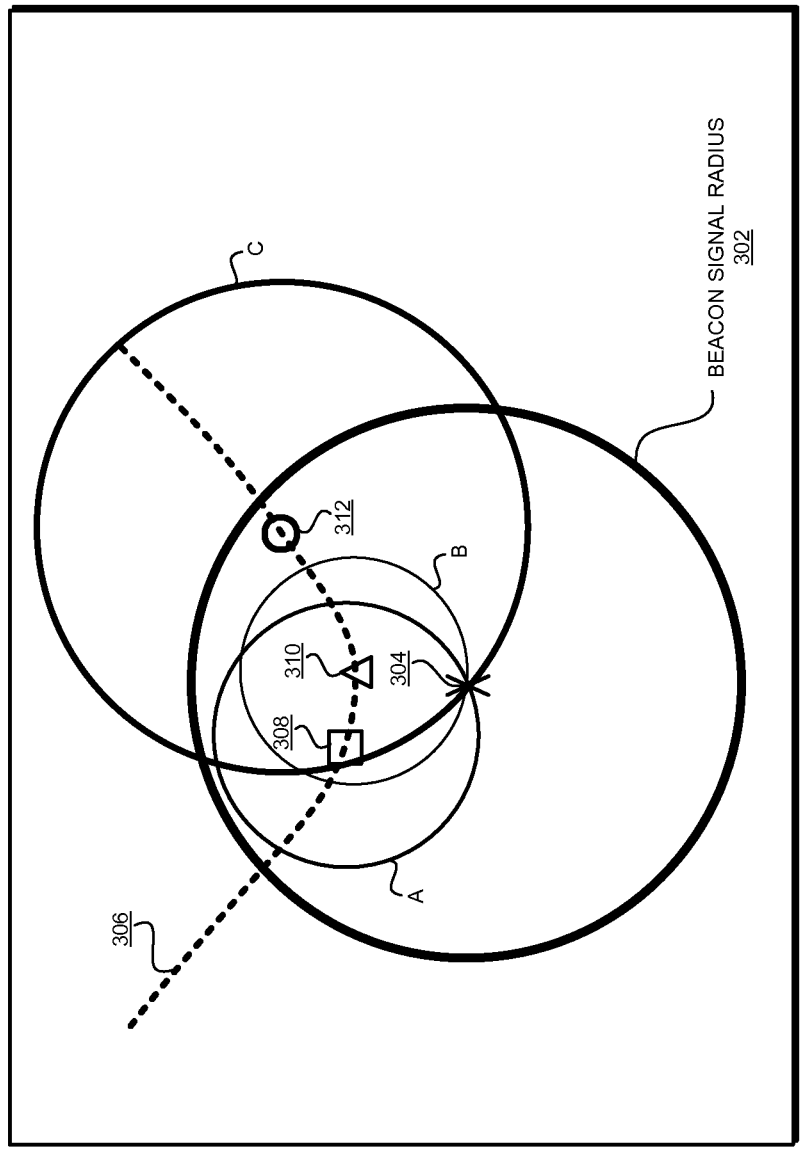
FIG. 3 depicts an example process of beacon-based detection of a lost device in accordance with an illustrative embodiment.

With reference to FIG. 3, this figure depicts an example process of beacon-based detection of a lost device in accordance with an illustrative embodiment. Beacon signal radius 302 defines an area around location 304 of a beacon associated with a lost device, such as of beacon 146 of lost device 142 in FIG. 1. The process described in this figure is an example of trilateration method of locating the lost device. From this disclosure, those of ordinary skill in the art will be able to adapt an embodiment to perform triangulation or multi-angulation instead, and such adaptations are contemplated within the scope of the illustrative embodiments.

Assume that a proximate device, such as mobile device 132 in FIG. 1 follows travel path 306 near the lost device. When the proximate device reaches point 308, the proximate device is located relative to the beacon of the lost device at a distance equal to the distance between points 308 and 304. When the proximate device detects the broadcast of the beacon from that distance, from the proximate device's point of view, the beacon can be located anywhere in area "A" as shown. The proximate device measures a signal strength of the broadcast as S1.

The signal strength has a known mathematical relationship with the distance between a transmitter and a receiver. For example, in some cases, but not necessarily, signal strength S1 is inversely proportional to the distance between points 308 and 304. In some other cases, a more complex mathematical expression described the relationship between the signal strength and the distance. Other signal strengths described herein are similarly related to and computable from the corresponding distances between a beacon and a proximate device.

Upon further traversal, the proximate device reaches point 310 and detects the broadcast from the beacon again. When the proximate device reaches point 310, the proximate device is located relative to the beacon of the lost device at a distance equal to the distance between points 310 and 304. When the proximate device detects the broadcast of the beacon from that distance, from the proximate device's point of view, the beacon can be located anywhere in area "B" as shown. The proximate device measures a signal strength of the broadcast as S2.

As shown, point 310 is closer to the beacon therefore signal strength S2 will be stronger than signal strength S1. Given only the two measurements, the lost device can be located at any of the two intersections of areas A and B and the location of the lost device is therefore still uncertain.

Upon further traversal, the proximate device reaches point 312 and detects the broadcast from the beacon again. When the proximate device reaches point 312, the proximate device is located relative to the beacon of the lost device at a distance equal to the distance between points 312 and 304. When the proximate device detects the broadcast of the beacon from that distance, from the proximate device's point of view, the beacon can be located anywhere in area "C" as shown. The proximate device measures a signal strength of the broadcast as S3.

As shown, point 312 is farther from the beacon as compared to point 310; therefore signal strength S3 will be weaker than signal strength S2. Given the three measurements, the lost device has to be located at the intersection of areas A, B, and C, and the location of the lost device is therefore established with certainty at location 304. More traversals and measurements can help disambiguate rare ambiguous situations even with three measurements, improve a precision with which the location 304 can be established, or some combination thereof.

Application 134 implements an embodiment that operates in a proximate device, such as in the proximate device traversing path 306. When application 134 implements one embodiment described herein, application 134 sends to application 105 at server 104 in FIG. 1, locations 308, 310, and 312 of the proximate device along with the corresponding signal strength measurements of the beacon transmissions. Application 105 computes location 304 from locations 308, 310, and 312, and the signal strengths S1, S2, and S3.

When application 134 implements another embodiment described herein, application 134 computes location 304 from locations 308, 310, and 312, and the signal strengths S1, S2, and S3. Application 134 then sends to application 105 at server 104, computed location 304 of the lost device.

Figure 4:
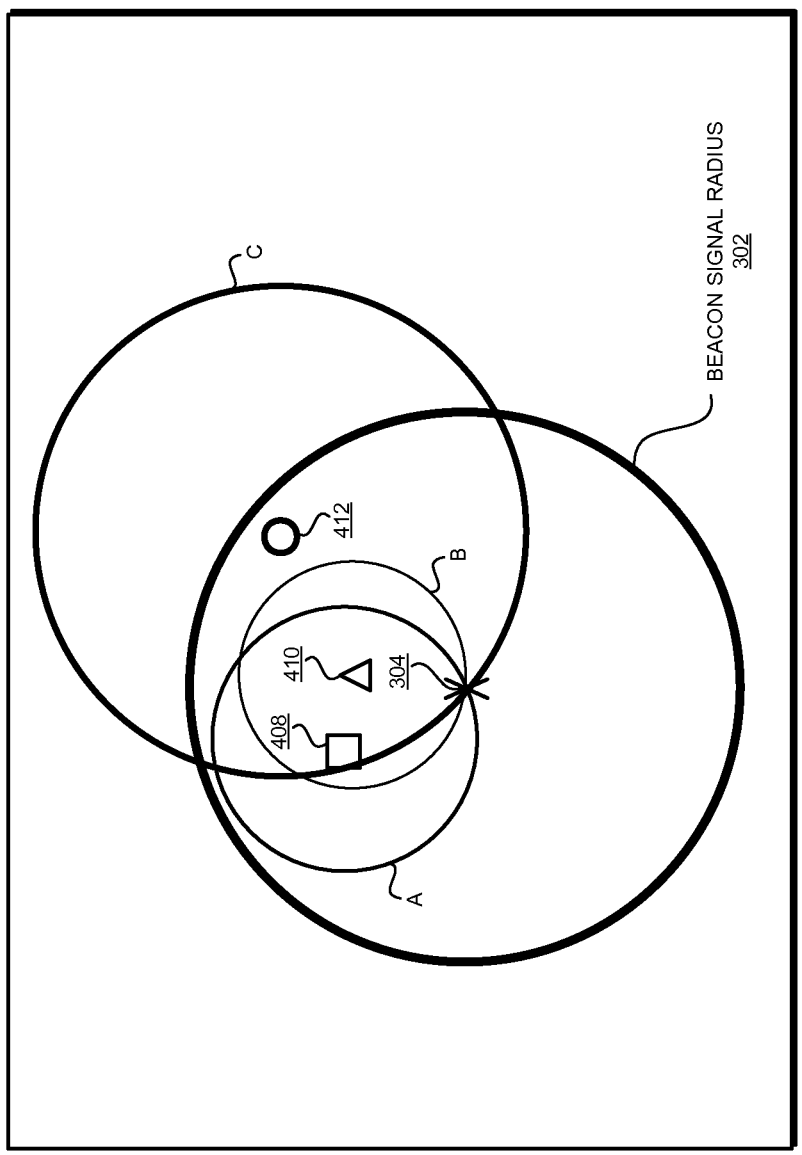
FIG. 4 depicts another example process of beacon-based detection of a lost device in accordance with an illustrative embodiment.

With reference to FIG. 4, this figure depicts another example process of beacon-based detection of a lost device in accordance with an illustrative embodiment. Beacon signal radius 302 defines an area around location 304 of a beacon associated with a lost device, such as of beacon 146 of lost device 142 in FIG. 1. The process described in this figure is an example of trilateration method of locating the lost device. From this disclosure, those of ordinary skill in the art will be able to adapt an embodiment to perform triangulation or multi-angulation instead, and such adaptations are contemplated within the scope of the illustrative embodiments.

Assume that one proximate device, such as mobile device 132 in FIG. 1 is located at point 408, relative to the beacon of the lost device at a distance equal to the distance between points 408 and 304. The proximate device at point 408 detects the broadcast of the beacon from that distance, and from the proximate device's point of view, the beacon can be located anywhere in area "A" as shown. The first proximate device at point 408 measures a signal strength of the broadcast as S1.

Another proximate device is located at point 410 and detects the broadcast from the beacon. Based on the detection by the second proximate device at point 410, the beacon can be located anywhere in area "B" as shown. The second proximate device at point 410 measures a signal strength of the broadcast as S2.

Similarly, another proximate device is located at point 412 and detects the broadcast from the beacon. Based on the detection by the third proximate device at point 412, the beacon can be located anywhere in area "C" as shown. The third proximate device at point 412 measures a signal strength of the broadcast as S3.

Assume that each of the three proximate devices is operating application 134. Application 134 of the first proximate device sends to application 105 location 408 and signal strength S1. Application 134 of the second proximate device sends to application 105 location 410 and signal strength S2. Application 134 of the third proximate device sends to application 105 location 412 and signal strength S3. Using the communications from the three proximate devices or more in a similar manner, application 105 computes location 304 from locations 408, 410, and 412, and the signal strengths S1, S2, and S3.

Various embodiments, such as those described with respect to FIGS. 3 and 4 cause a proximate device to detect a beacon broadcast and perform a transmission to the proximate device's service provider system. In some cases, when a proximate device detects a beacon transmission from a lost device, the proximate device may itself not have data connectivity to the proximate device's service provider system. Under such circumstances, an embodiment causes the proximate device to save the identifier from the beacon and the proximate device's own location, and causes the proximate device to perform the transmission as described herein at a later time in response to data connectivity to the proximate device's service provider system being restored.

Figure 5:
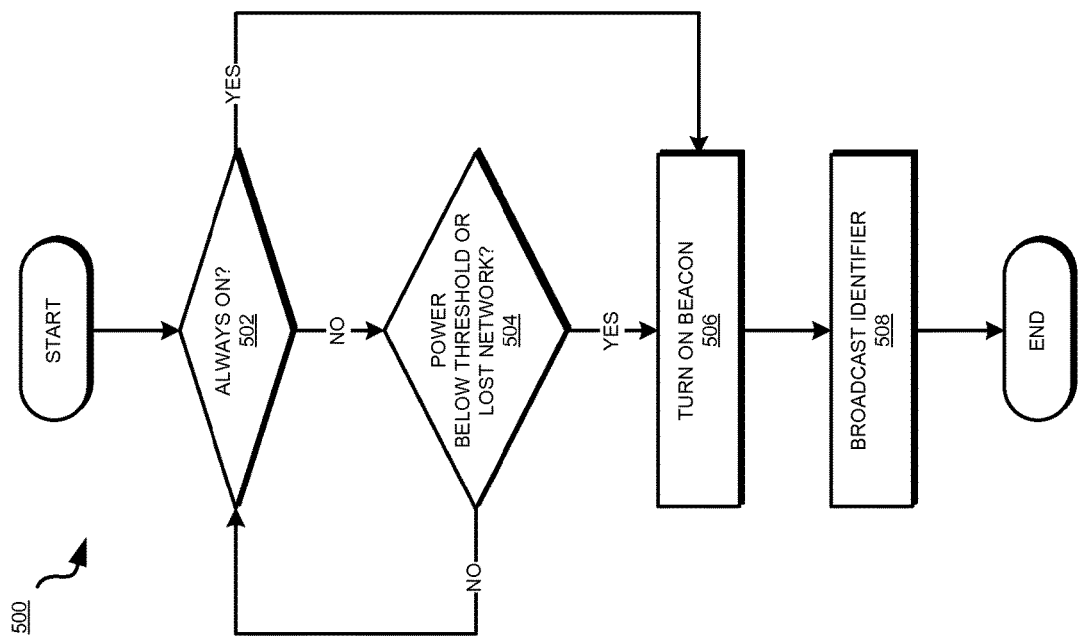
FIG. 5 depicts a flowchart of an example portion of a process for power and network independent locating of a lost device in accordance with an illustrative embodiment.

With reference to FIG. 5, this figure depicts a flowchart of an example portion of a process for power and network independent locating of a lost device in accordance with an illustrative embodiment. Process 500 can be implemented in application 144 of lost device 142 in FIG. 1.

The application determines whether the beacon of the lost device should operate regardless of a power and/or network condition at the lost device (block 502). If the beacon should operate by considering a power and/or network condition at the lost device ("No" path of block 502), the application determines whether the power source of the lost device has depleted below a threshold, a connectivity to a data network has been lost, or both (block 504). If the power availability is above the threshold and the data connectivity is available at the lost device ("No" path of block 504), the application returns process 500 to block 502.

If the beacon of the lost device should operate without considering a power and/or network condition at the lost device ("Yes" path of block 502), or in response to the power availability falling below the threshold and/or the data connectivity becoming unavailable at the lost device ("Yes" path of block 504), the application turns the beacon on in the lost device such that the beacon begins to periodically broadcast an identifier associated with the lost device (block 506). The application causes the beacon to broadcast the identifier (block 508). The application ends process 500 thereafter.

Figure 6:
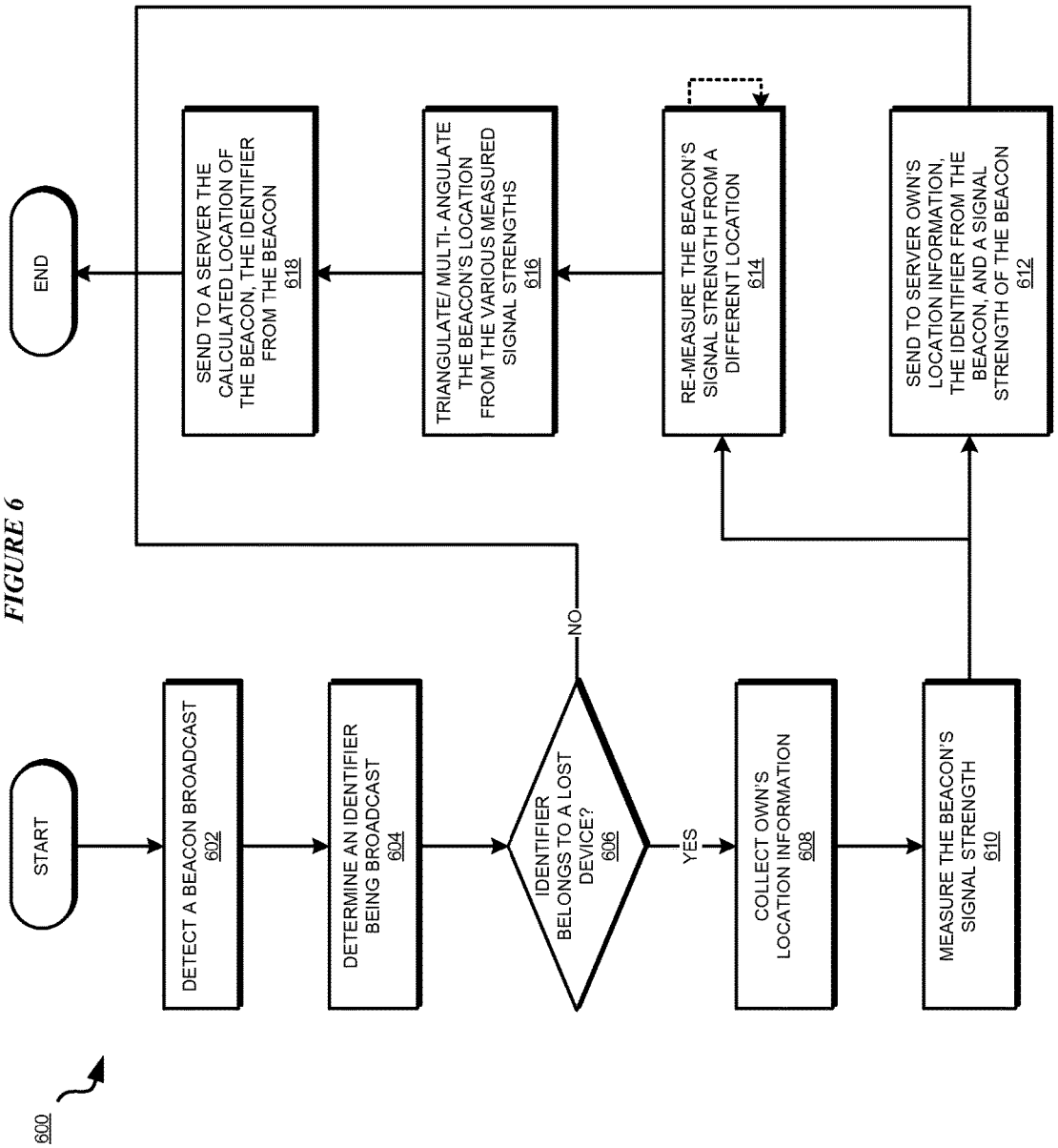
FIG. 6 depicts a flowchart of another example portion of a process for power and network independent locating of a lost device in accordance with an illustrative embodiment.

With reference to FIG. 6, this figure depicts a flowchart of another example portion of a process for power and network independent locating of a lost device in accordance with an illustrative embodiment. Process 600 can be implemented in application 134 of proximity device 132 in FIG. 1.

The application detects a broadcast from a beacon of a lost device (block 602). The application reads an identifier in the broadcast (block 604).

The application determines whether the identifier belongs to a lost device (block 606). For example, the application sends to the service provider of the proximate device the identifier with a request to verify whether the identifier is that of a lost device. The service provider maintains or obtains—such as from other service providers—a record of lost devices and their associated identifiers. In response to a determination that the identifier supplied by the application matches an identifier that is flagged as an identifier of a lost device, the service provider sends an affirmative response to the application. No response or a negative response from the service provider indicates to the application that the identifier is not associated with a lost device.

Note that while process 600 is described with respect to a single lost device, a single beacon, and a single identifier, in some circumstances, the application may be able to receive multiple identifiers from multiple beacons operating in a crowded space. The application can verify, one by one, whether an identifier belongs to a lost device. Alternatively, the application can collect the received identifiers, send one batch verification request with all the received identifiers, and receive a batch response indicating a lost status of one or more of those identifiers.

If, at block 606, the application determines that the identifier does not belong to a lost device ("No" path of block 606), the application ends process 600 thereafter. If however, the application determines that the identifier does belong to a lost device ("Yes" path of block 606), the application collects the location information of the proximate device where the application is executing (block 608). The application also measures the signal strength of the beacon's transmission (block 610).

Depending upon a configuration of the application, the application follows one of two possible paths in process 600. In one path, the application sends the location from block 608, the signal strength from block 610, and optionally the identifier again, to a system of the service provider (block 612). The application ends process 600 thereafter.

In another path through process 600, the application re-measures the signal strength from another location (block 614). The application performs the re-measurement from two or more different locations in this manner.

The application, using a processor and a memory at the proximate device, performs trilateration, triangulation, or multi-angulation, depending upon the number of measurements and different locations from where the measurements are made, the beacon's location (block 616). The application sends the calculated location of the beacon to the service provider's system (block 618). The application ends process 600 thereafter.

Figure 7:
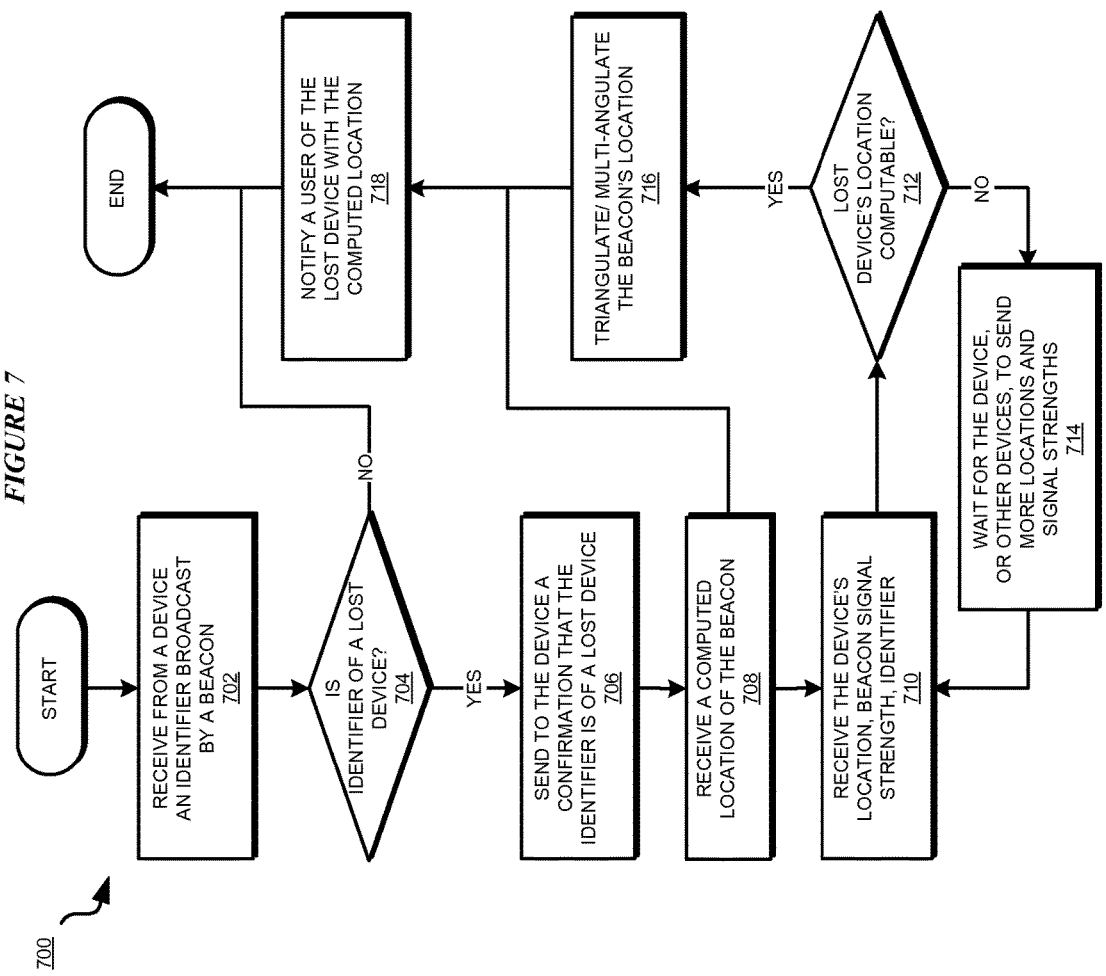
FIG. 7 depicts a flowchart of another example portion of a process for power and network independent locating of a lost device in accordance with an illustrative embodiment.

With reference to FIG. 7, this figure depicts a flowchart of another example portion of a process for power and network independent locating of a lost device in accordance with an illustrative embodiment. Process 700 can be implemented in application 105 in server 104 in FIG. 1, which is a system of a service provider of a proximate device.

The application receives from a proximate device an identifier that is being broadcast by a beacon (block 702). The application determines whether the identifier has been marked as belonging to a lost device (block 704).

If the identifier has been marked as belonging to a lost device ("Yes" path of block 704), the application sends a confirmation to the proximate device that the identifier is that of a lost device (block 706). The application then follows one or two possible paths through process 700.

According to one path, such as when process 600 executes blocks 614-618, the application receives a computed location of the beacon associated with the lost device (block 708). The application proceeds to block 718 thereafter.

According to another path, such as when process 600 executes block 612, the application receives the proximate device's location, the signal strength of the beacon (block 710). At block 710 the application may optionally also receive the identifier of the lost device again, but receiving the identifier is not necessary in some cases because the identifier has already been received from the proximate device at block 702. For example, receiving the identifier is not necessary when the application maintains a state information about process 700 relative to a proximate device, when a proximate device sends only one identifier, or some combination thereof.

The application determines if process 700 has sufficient information to compute a location of the beacon (block 712). If at least three locations of proximate device(s) and three signal strength measurements have not yet been received for an identifier ("No" path of block 712), the application waits for the same or different proximate device(s) to report additional locations and signal strengths from those locations (block 714). If the location of the lost device is computable, i.e., in response to at least three locations of proximate device(s) and three signal strength measurements being received for an identifier ("No" path of block 712), the application performs trilateration, triangulation, or multi-angulation—as the case may be—the location of the beacon and thereby computes the location of the lost device (block 716).

The application notifies a user of the lost device about the location of the lost device (block 718). The application ends process 700 thereafter.

Thus, a computer implemented method, system or apparatus, and computer program product are provided in the illustrative embodiments for power and network independent locating of a lost device. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   detecting, at a proximate device, a broadcast from a beacon associated with a mobile device, the broadcast comprising an identifier associated with the mobile device;
   sending the identifier to a service provider system;
   receiving, from the service provider system, a confirmation that the mobile device associated with the identifier is lost;
   determining, at the proximate device, responsive to the receiving, a first location of the proximate device at a first time;
   measuring, using a processor and a memory at the proximate device, a first signal strength of the broadcast at the first time and at the first location;
   sending the first location and the first signal strength from the proximate device to the service provider system;
   determining a second location and a second signal strength at the proximate device at a second time;
   sending the second location and the second signal strength from the proximate device to the service provider system at the second time;
   determining a third location and a third signal strength at the proximate device at a third time;
   sending the third location and the third signal strength from the proximate device to the service provider system at the third time; and causing a computing of a location of the beacon at the service provider system using the first signal strength and the first location from the proximate device, using the second signal strength and the second location from the proximate device and a third signal strength, and the third location from the proximate device.

2. The method of claim 1, further comprising:

detecting, at the proximate device, a plurality of identifiers in a plurality of broadcasts from a plurality of beacons associated with a plurality of mobile devices, the plurality of broadcasts including the broadcast, the plurality of beacons including the beacon, the plurality of mobile devices including the mobile device, the plurality of identifiers including the identifier, each identifier in the plurality of identifiers comprising a unique identifier associated with a corresponding mobile device from the plurality of mobile devices;

sending the plurality of identifiers to the service provider system;

receiving, from the service provider system, a confirmation that the mobile device associated with the identifier is lost but another mobile device associated with another identifier in the plurality of identifiers is not lost;

omitting, at a second time, measuring a signal strength of another beacon broadcasting the other identifier of the other mobile device; and measuring, at the second time, the second signal strength of beacon broadcasting the identifier of the mobile device.

3. The method of claim 2, further comprising:

saving, for a period, at the proximate device, those identifiers that are received during the period;

batching the saved identifiers in one request to send to the service provider system, the saved identifiers forming the plurality of identifiers; and transmitting, as a part of sending the plurality of identifiers to the service provider system, the one request.

4. The method of claim 1, wherein causing the computing of the location of the beacon to occur at the service provider system is responsive to the sending of the first location and the first signal strength, the second location and the second signal strength, and the third location and the third signal strength.

5. The method of claim 1, wherein the proximate device is another mobile device situated within a range of a broadcast of the beacon and configured to receive the broadcast.

6. The method of claim 1, wherein the proximate device is a stationary device situated within a range of a broadcast of the beacon and configured to receive the broadcast.

7. The method of claim 1, wherein the beacon comprises a power source separate from a power source of the mobile device, and wherein the broadcast from the beacon uses a data communication path that is configured in the beacon and distinct from all other data communication paths configured in the mobile device.

8. The method of claim 7, wherein the power source of the beacon powers the beacon when exposed to radio frequency energy.

9. The method of claim 1, wherein the method is embodied in a computer program product comprising one or more computer-readable storage devices and computer-readable program instructions which are stored on the one or more computer-readable storage devices and executed by one or more processors.

10. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

11. A computer program product comprising one or more computer-readable storage devices, and program instructions stored on at least one of the one or more storage devices, the stored program instructions comprising:

program instructions to detect, at a proximate device, a broadcast from a beacon associated with a mobile device, the broadcast comprising an identifier associated with the mobile device;

program instructions to send the identifier to a service provider system;

program instructions to receive, from the service provider system, a confirmation that the mobile device associated with the identifier is lost;

program instructions to determine, at the proximate device, responsive to receiving the confirmation, a first location of the proximate device at a first time;

program instructions to measure, using a processor and a memory at the proximate device, a first signal strength of the broadcast at the first time and at the first location;

program instructions to send the first location and the first signal strength from the proximate device to the service provider system;

program instructions to determine a second location and a second signal strength at the proximate device at a second time;

program instructions to send the second location and the second signal strength from the proximate device to the service provider system at the second time;

program instructions to determine a third location and a third signal strength at the proximate device at a third time;

program instructions to send the third location and the third signal strength from the proximate device to the service provider system at the third time; and program instructions to cause a computing of a location of the beacon at the service provider system using the first signal strength and the first location from the proximate device, using the second signal strength and the second location from the proximate device and a third signal strength, and the third location from the proximate device.

12. The computer program product of claim 11, the stored program instructions further comprising:

program instructions to detect, at the proximate device, a plurality of identifiers in a plurality of broadcasts from a plurality of beacons associated with a plurality of mobile devices, the plurality of broadcasts including the broadcast, the plurality of beacons including the beacon, the plurality of mobile devices including the mobile device, the plurality of identifiers including the identifier, each identifier in the plurality of identifiers comprising a unique identifier associated with a corresponding mobile device from the plurality of mobile devices;

program instructions to send the plurality of identifiers to the service provider system;

program instructions to receive, from the service provider system, a confirmation that the mobile device associated with the identifier is lost but another mobile device associated with another identifier in the plurality of identifiers is not lost;

program instructions to omit, at a second time, measuring a signal strength of another beacon broadcasting the other identifier of the other mobile device; and program instructions to measure, at the second time, the second signal strength of beacon broadcasting the identifier of the mobile device.

13. The computer program product of claim 12, the stored program instructions further comprising:

program instructions to save, for a period, at the proximate device, those identifiers that are received during the period;

program instructions to batch the saved identifiers in one request to send to the service provider system, the saved identifiers forming the plurality of identifiers; and program instructions to transmit, as a part of sending the plurality of identifiers to the service provider system, the one request.

14. The computer program product of claim 11, wherein causing the computing of the location of the beacon to occur at the service provider system is responsive to the sending of the first location and the first signal strength, the second location and the second signal strength, and the third location and the third signal strength.

15. The computer program product of claim 11, wherein the proximate device is another mobile device situated within a range of a broadcast of the beacon and configured to receive the broadcast.

16. A method comprising:

turning a beacon on at a mobile device, wherein the turning on is responsive to a condition occurring in the mobile device;

causing, as a result of the beacon turning on, a detection at a proximate device, of a broadcast from the beacon associated with the mobile device, the broadcast comprising an identifier associated with the mobile device;

causing, as a result of the detection, a sending of the identifier to a service provider system;

causing, as a result of the sending, a confirmation from the service provider system that the mobile device associated with the identifier is lost;

causing, as a result of the confirmation, a determining, at the proximate device, of a first location of the proximate device at a first time;

causing, as a result of the determining, a measuring, at the proximate device, of a first signal strength of the broadcast at the first time and at the first location;

causing, as a result of the measuring, a computing, at the service provider system, of a location of the beacon using the first signal strength and the first location from the proximate device, a second signal strength measurement at a second location of the proximate device, and a third signal strength at a third location of the proximate device.

17. The method of claim 16, wherein the condition includes a remaining power from a power source of the mobile device reducing below a threshold amount of remaining power.

18. The method of claim 16, wherein the condition includes losing a data connectivity configured in the mobile device.

* * * * *